United States Patent
Connally et al.

(10) Patent No.: US 7,186,947 B2
(45) Date of Patent: Mar. 6, 2007

(54) PROCESS MONITOR FOR LASER AND PLASMA MATERIALS PROCESSING OF MATERIALS

(75) Inventors: William J. Connally, Grantham, NH (US); Kenneth J. Woods, Lebanon, NH (US)

(73) Assignee: Hypertherm, Inc., Hanover, NH (US)

( * ) Notice: Subject to any disclaimer, the term of this patent is extended or adjusted under 35 U.S.C. 154(b) by 0 days.

(21) Appl. No.: 10/403,775

(22) Filed: Mar. 31, 2003

(65) Prior Publication Data

US 2004/0188397 A1    Sep. 30, 2004

(51) Int. Cl.
*B23K 26/38*    (2006.01)

(52) U.S. Cl. ............................... 219/121.72

(58) Field of Classification Search ............ 219/121.6, 219/121.62–121.72, 121.83; 707/200
See application file for complete search history.

(56) References Cited

U.S. PATENT DOCUMENTS

| | | | |
|---|---|---|---|
| 3,795,918 A | 3/1974 | Sunderland | 356/45 |
| 3,866,484 A | 2/1975 | Dreshman | 74/422 |
| 3,912,242 A | 10/1975 | Schoffmann | 266/23 K |
| 3,918,480 A | 11/1975 | Leo | 137/488 |
| 3,929,324 A | 12/1975 | Lotz et al. | 266/23 K |
| 4,003,556 A | 1/1977 | Roeder | 266/48 |
| 4,081,215 A | 3/1978 | Penney et al. | 356/45 |
| 4,101,754 A | 7/1978 | Fischer | 219/121 |
| 4,111,404 A | 9/1978 | Benko | 266/58 |
| 4,125,250 A | 11/1978 | Herbener et al. | 266/50 |
| 4,133,988 A | 1/1979 | Esibyan et al. | 219/121 |
| 4,143,929 A | 3/1979 | Boje et al. | 339/5 M |
| 4,156,125 A | 5/1979 | Brown | 219/124.02 |
| 4,170,727 A | 10/1979 | Wilkins | 219/121 |
| 4,172,586 A | 10/1979 | Schmitt | 266/48 |
| 4,172,587 A | 10/1979 | Boje et al. | 266/60 |
| 4,180,248 A | 12/1979 | Benko | 266/67 |
| 4,202,707 A | 5/1980 | Hennecke | 148/9 R |
| 4,225,769 A | 9/1980 | Wilkins | 219/130.4 |
| 4,251,205 A | 2/1981 | Roeder et al. | 431/263 |
| 4,305,573 A | 12/1981 | Boje et al. | 266/60 |
| 4,333,635 A | 6/1982 | Koukal | 266/64 |
| 4,363,468 A | 12/1982 | Noe | 266/76 |
| 4,410,266 A | 10/1983 | Seider | 356/45 |

(Continued)

FOREIGN PATENT DOCUMENTS

DE    0 2 203 194    4/1973

(Continued)

OTHER PUBLICATIONS

Rogozinski, M.W. et al., "Development of a "Smart" Plasma Arc Cutting System" Electrical Engineering Congress, Nov. 24-30, 1994.

(Continued)

Primary Examiner—Samuel M. Heinrich
(74) Attorney, Agent, or Firm—Proskauer Rose LLP

(57) ABSTRACT

A method for monitoring the processing of a workpiece includes directing an incident laser beam onto the workpiece and measuring a signal emitted from the workpiece. At least two signals are generated by a detector based upon the emitted signal. A workpiece processing quality is determined based upon the ratio of the two output signals and a magnitude of one of the two outputs.

26 Claims, 7 Drawing Sheets

U.S. PATENT DOCUMENTS

| | | | |
|---|---|---|---|
| 4,444,169 A | 4/1984 | Kirisawa et al. | 123/344 |
| 4,466,069 A | 8/1984 | Balfanz | 364/475 |
| 4,475,719 A | 10/1984 | Lotz | 266/48 |
| 4,478,393 A | 10/1984 | Komma et al. | 266/49 |
| 4,527,777 A | 7/1985 | Lotz | 266/50 |
| 4,560,856 A * | 12/1985 | Miller et al. | 219/121.63 |
| 4,602,967 A | 7/1986 | Komma et al. | 148/9 R |
| 4,644,173 A | 2/1987 | Jeffers | 250/554 |
| 4,708,493 A | 11/1987 | Stein | 374/128 |
| 4,735,399 A | 4/1988 | Lotz | 266/50 |
| 4,742,236 A | 5/1988 | Kawakami et al. | 250/554 |
| 4,764,669 A | 8/1988 | Decker et al. | 250/202 |
| 4,775,774 A | 10/1988 | Caneer, Jr. | 219/121.55 |
| 4,814,577 A | 3/1989 | Dallavalle et al. | 219/121.57 |
| 4,817,020 A | 3/1989 | Chande et al. | 364/557 |
| 4,819,658 A | 4/1989 | Kolodner | 128/736 |
| 4,881,823 A | 11/1989 | Tanaka et al. | 374/126 |
| 4,996,407 A | 2/1991 | Traxler | 219/121.54 |
| 5,017,752 A | 5/1991 | Severance, Jr. et al. | 219/121.59 |
| 5,038,016 A | 8/1991 | Robertson et al. | 219/121.83 |
| 5,039,837 A | 8/1991 | Nourbakhsh et al. | 219/121.48 |
| 5,070,227 A | 12/1991 | Luo et al. | 219/121.55 |
| 5,071,106 A * | 12/1991 | Helkenberg | 266/58 |
| 5,106,201 A | 4/1992 | Neuhaus | 374/131 |
| 5,166,494 A | 11/1992 | Luo et al. | 219/121.55 |
| 5,189,277 A | 2/1993 | Boisvert et al. | 219/121.54 |
| 5,225,658 A | 7/1993 | Yamaguchi et al. | 219/121.57 |
| 5,232,196 A | 8/1993 | Hutchings et al. | 251/129.08 |
| 5,262,612 A | 11/1993 | Momany et al. | 219/121.67 |
| 5,272,312 A | 12/1993 | Jurca | 219/121.83 |
| 5,288,970 A | 2/1994 | Nishi | 219/121.56 |
| 5,290,995 A | 3/1994 | Higgins et al. | 219/121.44 |
| 5,326,955 A | 7/1994 | Nishi et al. | 219/121.56 |
| 5,380,976 A | 1/1995 | Couch, Jr. et al. | 219/121.44 |
| 5,396,043 A | 3/1995 | Couch, Jr. et al. | 219/121.5 |
| 5,414,236 A | 5/1995 | Couch, Jr. et al. | 219/121.39 |
| 5,424,507 A | 6/1995 | Yamaguchi | 219/121.44 |
| 5,463,202 A | 10/1995 | Kurosawa et al. | 219/121.83 |
| 5,506,386 A | 4/1996 | Gross | 219/121.64 |
| 5,521,350 A | 5/1996 | Nishi et al. | 219/121.56 |
| 5,522,424 A | 6/1996 | Dalton, Jr. et al. | 137/560 |
| 5,591,357 A | 1/1997 | Couch, Jr. et al. | 219/121.39 |
| 5,614,110 A | 3/1997 | Shintani et al. | 219/121.44 |
| 5,638,389 A | 6/1997 | Nagano et al. | 372/31 |
| 5,653,896 A | 8/1997 | Couch, Jr. et al. | 219/121.44 |
| 5,695,662 A | 12/1997 | Couch, Jr. et al. | 219/121.39 |
| 5,717,187 A | 2/1998 | Rogozinski et al. | 219/121.54 |
| 5,756,960 A | 5/1998 | Rogozinski et al. | 219/121.54 |
| 5,801,355 A | 9/1998 | Saio et al. | 219/121.44 |
| 5,844,196 A | 12/1998 | Oakley | 219/121.54 |
| 5,866,869 A | 2/1999 | Schneider et al. | 219/121.39 |
| 5,866,872 A | 2/1999 | Lu et al. | 219/121.56 |
| 5,893,986 A | 4/1999 | Oakley et al. | 219/121.59 |
| 6,021,682 A | 2/2000 | Zeng | 73/866 |
| 6,028,287 A | 2/2000 | Passage et al. | 219/121.56 |
| 6,121,570 A | 9/2000 | Oakley et al. | 219/121.51 |
| 6,133,543 A | 10/2000 | Borowy et al. | 219/121.57 |
| 6,188,041 B1 * | 2/2001 | Kim et al. | 219/121.63 |
| 6,239,434 B1 | 5/2001 | Brown | 250/339.15 |
| 6,274,841 B1 | 8/2001 | Ramakrishnan et al. | 219/121.44 |
| 6,332,463 B1 | 12/2001 | Farrugia et al. | 128/204.18 |
| 6,344,625 B1 * | 2/2002 | Kim et al. | 219/121.62 |
| 6,346,712 B1 | 2/2002 | Popovic et al. | 250/554 |
| 6,350,988 B1 | 2/2002 | Brown | 250/339.07 |
| 6,359,251 B1 | 3/2002 | Picard et al. | 219/121.57 |
| 6,365,868 B1 | 4/2002 | Borowy et al. | 219/121.54 |
| 6,590,181 B2 | 7/2003 | Choo et al. | 219/121.68 |
| 6,642,482 B2 | 11/2003 | Rappl et al. | 219/130.5 |
| 2002/0088783 A1 | 7/2002 | Weber | 219/121.78 |
| 2002/0125233 A1 * | 9/2002 | Horn et al. | 219/121.72 |
| 2004/0129687 A1 | 7/2004 | Yamaguchi et al. | 219/121.39 |

FOREIGN PATENT DOCUMENTS

| | | |
|---|---|---|
| EP | 0 370 967 A1 | 5/1990 |
| EP | 0 370 967 B1 | 5/1990 |
| EP | 0 437 226 A2 | 7/1991 |
| EP | 0 437 226 A3 | 7/1991 |
| EP | 0 437 226 B1 | 7/1991 |
| EP | 1 161 126 A2 | 12/2001 |
| JP | 359163089 A * | 9/1984 |
| JP | 363302432 A * | 12/1988 |
| JP | 405045278 A * | 2/1993 |
| JP | 408215868 A * | 8/1996 |
| JP | 408281456 A * | 10/1996 |
| WO | WO 00/41837 | 7/2000 |
| WO | WO 03/041903 | 5/2003 |

OTHER PUBLICATIONS

Haferkamp, H. et al., "Quality Monitoring and Assurance for Laser Beam Cutting Using a Thermographic Process Control" *SPIE* vol. 3824 (Jun. 1999).

Miyamoto, I. et al., "Fundamental Study of In-Process Monitoring in Laser Cutting" $4_{th}$ International Colloquium on Welding and Melting By Electronics and Laser Beam, Sep. 26-30, 1988.

Olsen, F. O. "Investigations in Methods for Adaptive Control of Laser Processing" *Opto Electronic Magazine* vol. 4, No. 2. (1988).

Zheng, H. Y., "The Use of Fibre Optics for In-Process Monitoring of Laser Cutting" *ICALEO* vol. 69 (1989).

Haferkamp, H. et al., "Quality Monitoring and Assurance for Laser Beam Cutting Using a Thermographic Process Control" *SPIE* vol. 3824 (Jun. 1999).

\* cited by examiner

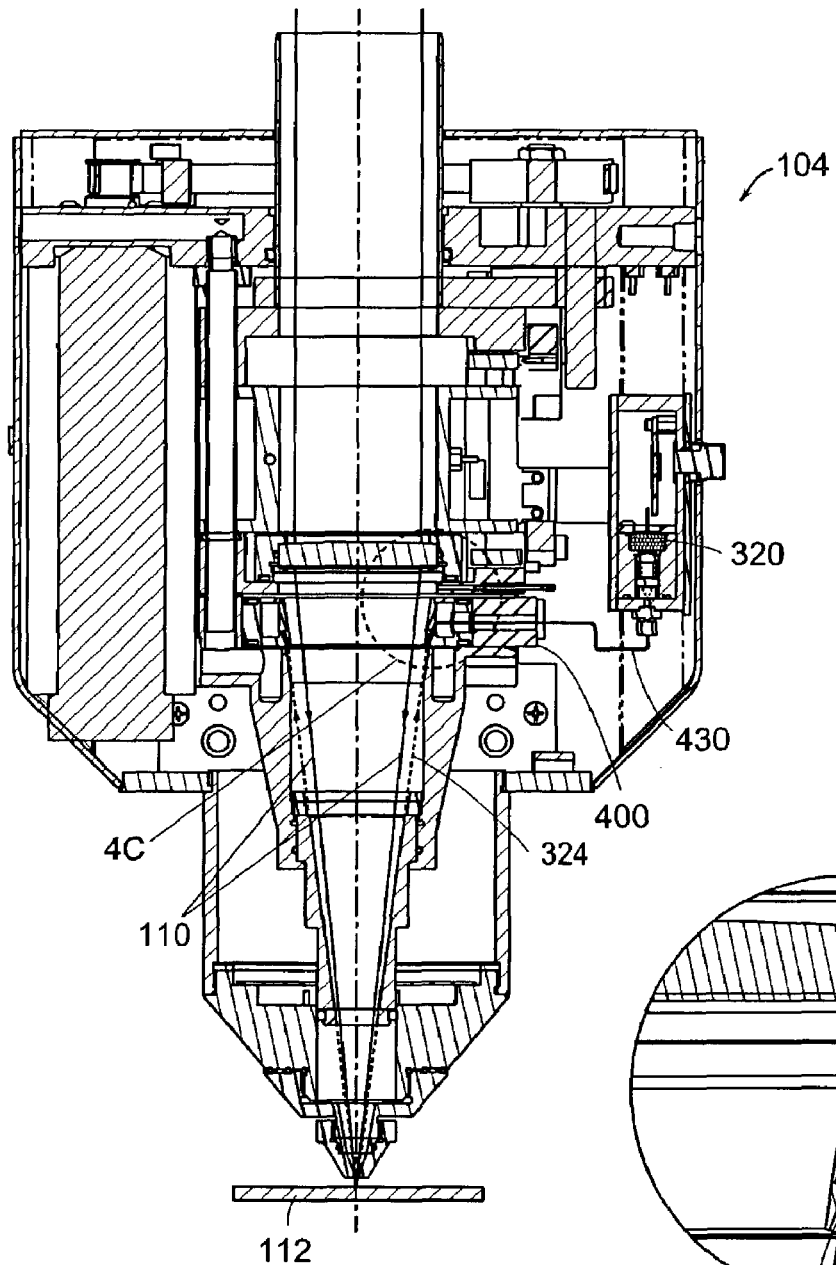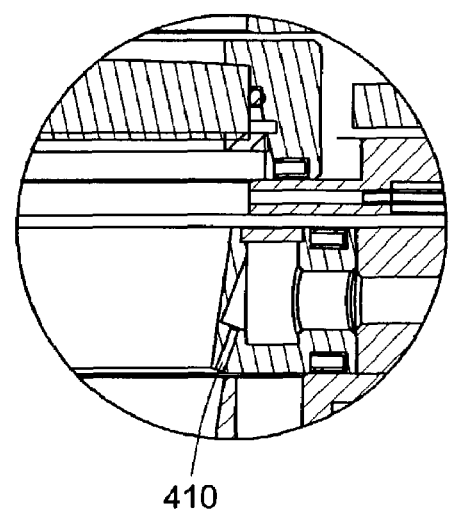
FIG. 4B
FIG. 4C

PROCESS MONITOR FOR LASER AND PLASMA MATERIALS PROCESSING OF MATERIALS

FIELD OF THE INVENTION

The present invention relates generally to an apparatus and method for determining the quality of the processing performed by a material processing system and, more particularly to an apparatus and method that uses an optical signal emitted by a workpiece during material processing to determine the quality of the processing being performed.

BACKGROUND OF THE INVENTION

Material processing apparatus, such as lasers and plasma arc torches, are widely used in the cutting, welding, and heat treating of metallic materials. A laser-based apparatus generally includes a nozzle through which a gas stream and laser beam pass to interact with a workpiece. Both the beam and the gas stream exit the nozzle through an orifice and impinge on a target area of the workpiece. The laser beam heats the workpiece. The resulting heating of the workpiece, combined with any chemical reaction between the gas and workpiece material, serves to heat, liquefy and/or vaporize a selected area of workpiece, depending on the focal point and energy level of the beam. This action allows the operator to cut or otherwise modify the workpiece.

Similarly, a plasma arc torch generally includes a cathode block with an electrode mounted therein, a nozzle with a central exit orifice mounted within a torch body, electrical connections, passages for cooling and arc control fluids, a swirl ring to control fluid flow patterns in the plasma chamber formed between the electrode and nozzle, and a power supply. The torch produces a plasma arc, which is a constricted ionized jet of a plasma gas with high temperature and high momentum that exits through the nozzle orifice and impinges on the workpiece. Gases used in the torch can be non-reactive (e.g., argon or nitrogen), or reactive (e.g., oxygen or air).

It is generally desirable that the results of any material processing be of high quality. For example, the edges of the cut kerf produced by laser and plasma cutting should be dross free, smooth, straight and uniform. Edge irregularities caused by, for example, uneven heating of the workpiece by the laser, excessive chemical reactions between the assist gas and workpiece, or incomplete removal of cutting debris, should be minimized.

Presently, the operation of CNC-controlled laser cutting systems typically requires several manual parameter adjustments to achieve workpiece processing results of desired quality. Consequently, users typically choose conservative values of process parameters to ensure process reliability over a wide range of operating conditions. The tradeoff often results in an accompanying decrease in material processing productivity (e.g., due to a reduced cutting speed in laser cutting). For more aggressive process parameters to be used, a reliable and automated means of monitoring the cutting process is necessary, which could alert the user to degradation in the quality of the cut in real time. Such a system could also be required to adjust to changes in operating conditions to maintain optimal process performance, i.e., good cut quality and maximum productivity.

SUMMARY OF THE INVENTION

The present invention relates to a method for monitoring the processing of a workpiece by a laser beam. An incident laser beam is directed onto the workpiece and then using an optical detector measures at least one signal emitted from the workpiece as a result of the incident laser beam. The detector generates two or more outputs based upon the at least one signal emitted from the workpiece. A light source monitor determines workpiece processing quality based upon a ratio of the two or more outputs as well as a magnitude of at least one of the two outputs. In one embodiment, the magnitude of the at least one of the two outputs may be a maximum value.

Various embodiments of the invention can include the following steps. Determining workpiece processing quality can include determining a location in a lookup table based on the ratio of the two outputs and the magnitude of at least one of the two outputs, followed by extracting a quality value from that location in the lookup table.

In one embodiment, the two outputs of the detector may comprise a first spectral band of light and a second spectral band of light. In another embodiment, the first spectral band of light may comprise a lower band of wavelengths of light than the second spectral band. In another embodiment, the first spectral band of light may be a spectral band between about 450 nm and about 650 nm, and the second spectral band of light may be a spectral band between about 950 nm and about 1,150 nm.

In one embodiment, the invention features an apparatus for processing and monitoring a workpiece. The apparatus includes a light source that directs an incident laser beam onto a workpiece. An optical detector is included for measuring at least one signal emitted from the workpiece in response to the incident laser beam. The optical detector can generate two outputs based on the at least one signal. The apparatus also includes a light source monitor that is in communication with the optical detector. The light source monitor can determine workpiece processing quality based upon a ratio of the two outputs and a magnitude of at least one of the two outputs.

In various embodiments of the invention, the light source monitor can determine a location in a lookup table based on the ratio and the magnitude of at least one of the two outputs, and then extracts a quality value from that location in the lookup table. In another embodiment, the magnitude of the at least one of the two outputs may be a maximum value.

The foregoing and other objects, aspects, features, and advantages of the invention will become more apparent from the following description and from the claims.

BRIEF DESCRIPTION OF THE DRAWINGS

In the drawings, like reference characters generally refer to corresponding parts throughout the different views. The drawings are not necessarily to scale, emphasis instead generally being placed on illustrating the principles and concepts of the invention.

FIG. 4B is a cross-section view of an embodiment of a laser cutting head and an optical receiver of the present invention.

FIG. 4C is a close-up cross-section view of a port in accordance with an embodiment of the present invention.

DETAILED DESCRIPTION

Figure 1:
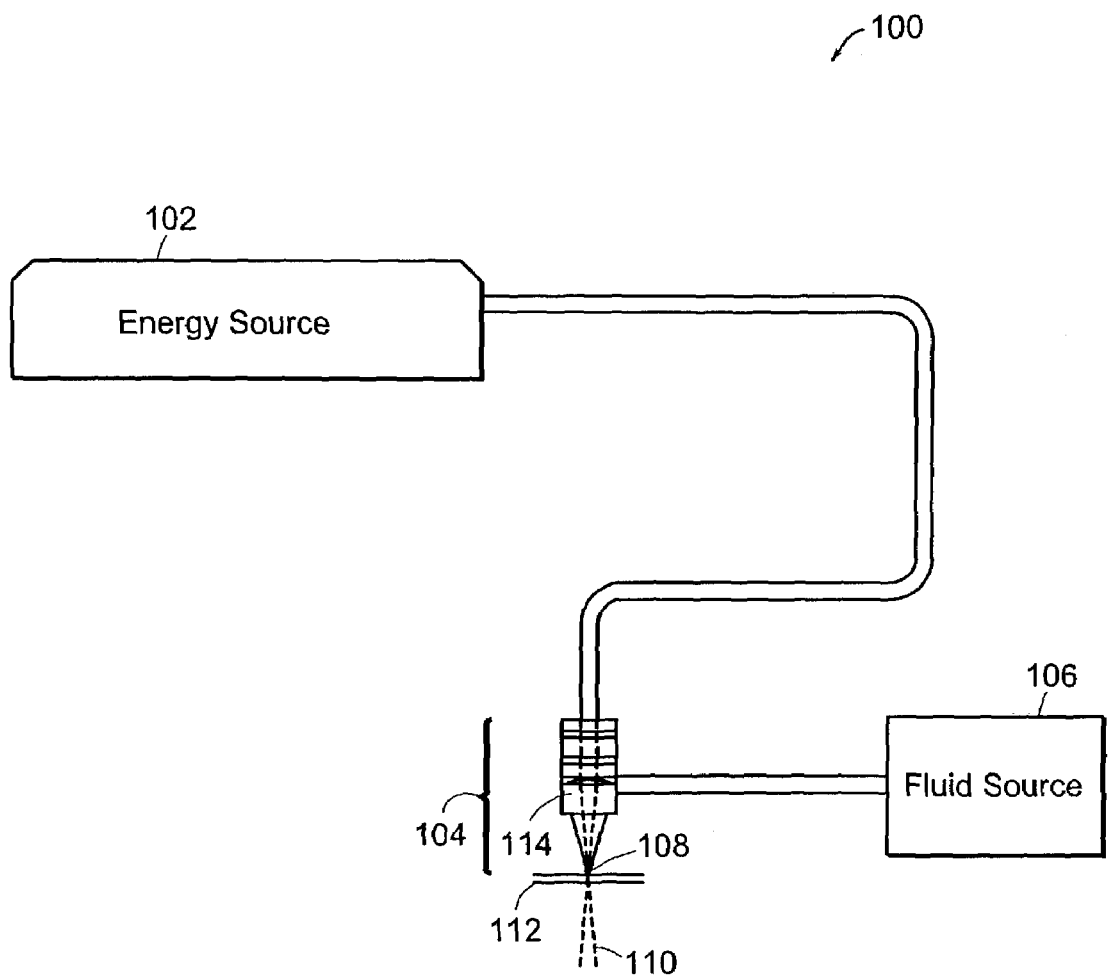
FIG. 1 is a block diagram of a material processing apparatus in accordance with an embodiment of the present invention.

As shown in the drawings for the purposes of illustration, a system according to the invention monitors the processing of a workpiece in an industrial environment. The system serves as an on-line cut monitor system that is insensitive to cutting direction and operates in near real-time to provide a reliable indication of cut quality. Measurement of the temperature of the cutting front has been found to be a generally reliable indicator of cut quality. More specifically, when a clean cut is being produced under optimal conditions, the average cut face temperature is relatively constant. Significant deterioration in cut quality, e.g., the presence of excessive dross, uneven kerf width, or rough cut edges are typically accompanied by variations in the cut face temperature. The system according to the invention is capable of detecting a gross change in the average temperature and irregular fluctuations in temperature of varying amplitude and frequency. In particular, the system measures light intensity at two spectral bands. The measured intensities are processed (e.g. a ratio of the spectral bands is determined and the results are used in conjunction with a lookup table to ascertain a cut-quality in real-time. In addition, remote sensing of the temperature relative to a laser beam has been found to be advantageous.

FIG. 1 shows a schematic sectional view of an embodiment of a material processing system 100. An energy source 102 generates an energy beam 110 and delivers it to a processing head assembly 104. A fluid source 106 supplies a fluid, such as an assist gas, to the processing head assembly 104. A chamber 114 receives a fluid supplied by the fluid source 106. A nozzle 108 is also disposed within the processing head assembly 104. The energy beam 110 and fluid pass through chamber 114 and the nozzle 108 and impinge on a workpiece 112 to cut, weld, heat treat, or otherwise modify the workpiece 112.

In one embodiment, the energy source 102 is a plasma source and the energy beam 110 is a plasma. In another embodiment, the energy source 102 is a laser and the energy beam 110 is a laser beam. In the plasma source embodiment, the chamber 114 can be a plasma chamber. In the laser source embodiment, the chamber 114 can be a plenum.

Figure 2:
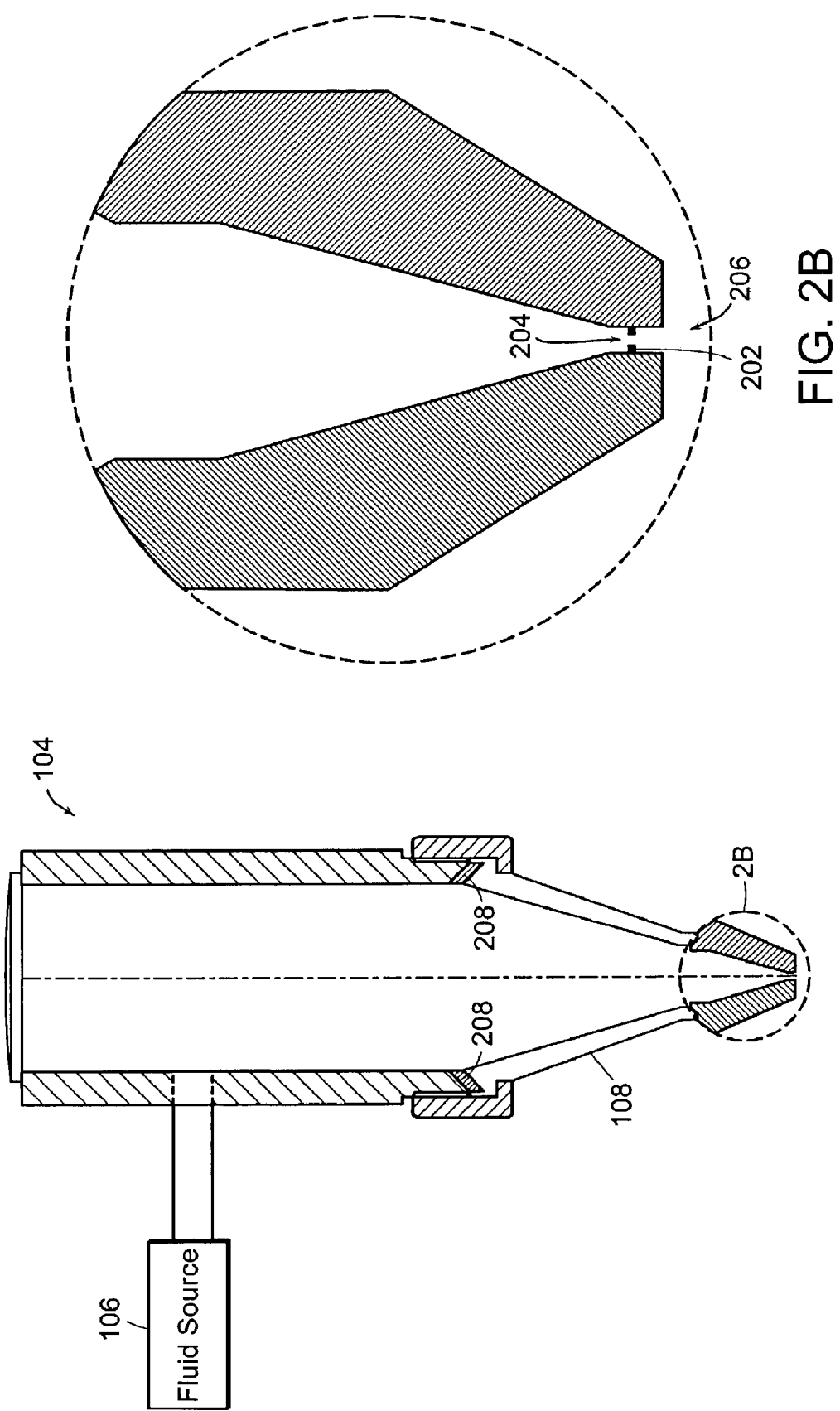
FIG. 2A is a schematic sectional view of a processing head assembly in accordance with an embodiment of the present invention.
FIG. 2B is a close-up schematic sectional view of a nozzle in accordance with an embodiment of the present invention.

FIG. 2A illustrates additional details of the processing head 104 and the nozzle 108. FIG. 2B provides a close-up view of a portion of the nozzle 108. The nozzle includes a central exit orifice 206. In some embodiments, a baffle 202 is disposed relative to the nozzle 108. The baffle 202 includes an opening 204 that is perpendicular to an axis of propagation of the energy beam 110 and substantially coincident with the central exit orifice 206.

The "working end" of the processing head assembly 104 is that portion closest to the workpiece 112. The working end typically degrades from use because of its direct exposure to the extreme conditions present on the workpiece 112 during material processing. These conditions include, for example, high temperature and a local atmosphere of highly reactive gas.

In one embodiment, the axis of the nozzle 108 is aligned with an axis of the processing head assembly 104. This ensures the energy beam 110 is centered in the central exit orifice 206 as it passes through en route to the workpiece 112. To maintain alignment, the nozzle 108 can have surfaces 208 that are contoured over a predetermined axial extent. The contoured surfaces 208 mate with adjacent structure of the processing head assembly 104. This mating action results in the coaxial alignment of the nozzle 108 and the processing head assembly 104, thereby improving accuracy and cut quality and extending the operational life of the working end of the assembly 104.

Figure 3:
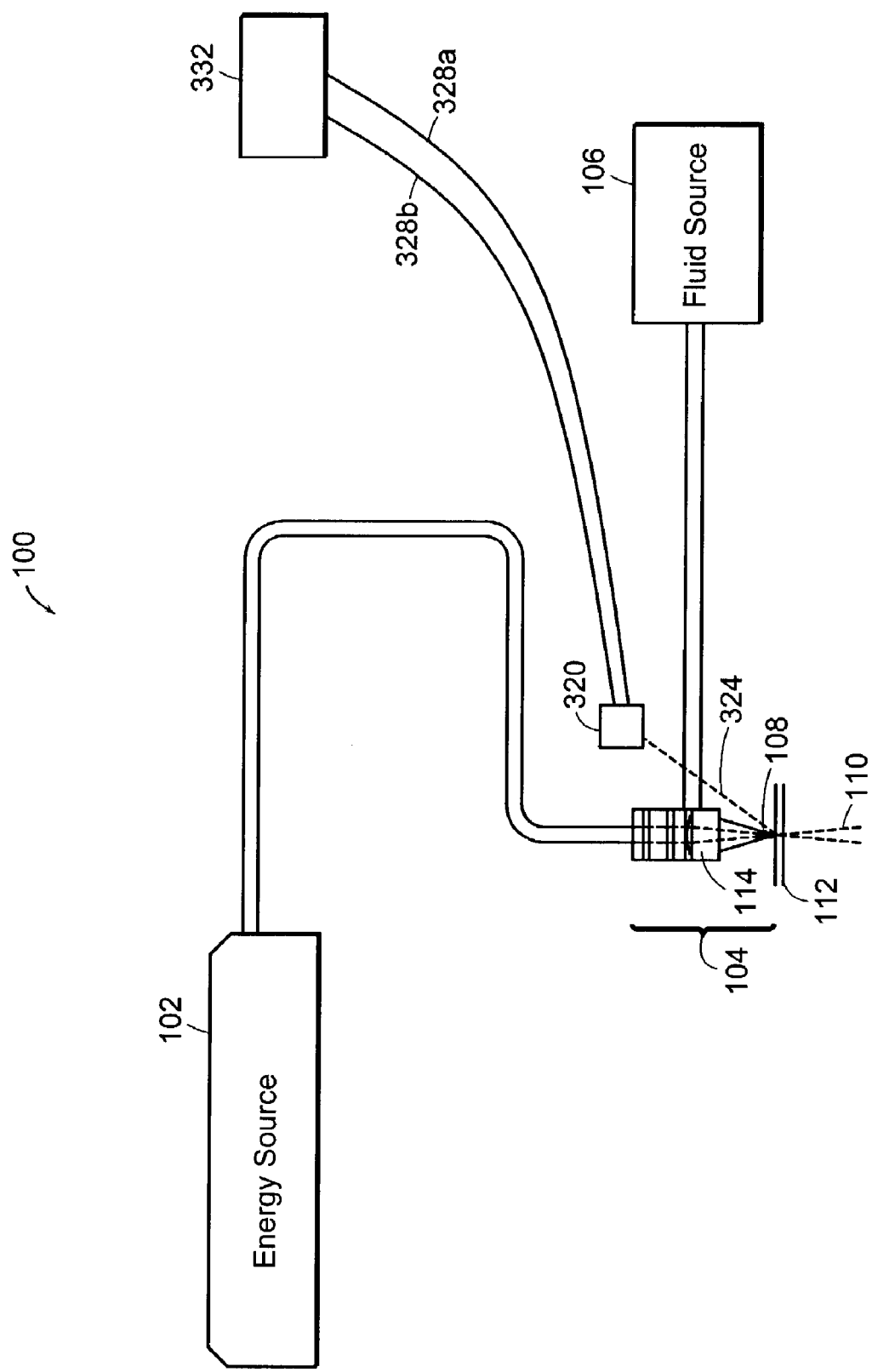
FIG. 3 is a block diagram of a material processing apparatus comprising a light source monitor in accordance with an embodiment of the present invention.

Referring to FIG. 3, the material processing system 100 includes an optical detector 320 that is used to measure a signal 324 that is emitted by the workpiece 112. The signal 324 is emitted by the workpiece in response to the energy beam 110 that impinges upon the workpiece 112. In one embodiment, the signal 324 can be an emission. The optical detector 320 generates an output 328 based upon the signal 324 measured by the optical detector 320. In one embodiment, the optical detector 320 is a silicon photodiode two color detector, model no. PIN-44DP sold by UDT Sensors, Inc., located in Hawthorne, Calif. The output 328 is provided to a light source monitor 332. In one embodiment, two optical detectors 320 can be used, where each detector is sensitive to different frequency ranges of the signal 324. The output of the two optical detectors in response to a first wavelength range 328a and a second wavelength range 328b are electrical signals transmitted to the light source monitor 332 via wires. In another embodiment, two optical detectors 320 can be replaced by one sandwich detector, which detects two ranges of wavelengths. In one embodiment, the sandwich detector can be sandwich detector, model no. PIN-DSS, sold by UDT Sensors, Inc., located in Hawthorne, Calif.

The light source monitor 332 determines the quality of the processing being performed on the workpiece 112 based upon the outputs 328a and 328b. In one embodiment, the light source monitor 332 can be a stand alone microprocessor. In another embodiment, the light source monitor 332 can be computerized numeric controller sold by Hypertherm Automation, located in West Lebanon, N.H.

To determine the quality of the processing being performed on the workpiece 112, the apparatus uses two-color pyrometry to evaluate the signal 324 emitted from the workpiece 112 in response to the energy beam 110. Two-color (i.e., two wavelengths of light) pyrometry involves the calculation of the radiant light intensity in discrete, narrow spectral bands. The system measures the radiant light intensity to determine the relative temperature of the kerf being formed by the head assembly (e.g., the cut zone).

Mathematically, the radiant light intensity of a black body over a narrow band of wavelength $d\lambda$ centered around the wavelength $\lambda$, is given by:

$$S_\lambda d\lambda = \frac{2\pi c^2 h}{\lambda^5} \frac{1}{e^{hc/kT\lambda} - 1} d\lambda, \quad (1)$$

where c is the speed of light, h is Planck's constant, k is Boltzmann's constant and T is the temperature of the black-body. The ratio of the intensities detected at two different wavelengths, $\lambda_1$ and $\lambda_2$ is:

$$\text{Intensity Ratio} = \frac{S_{\lambda_2} d\lambda_2}{S_{\lambda_1} d\lambda_1} = \frac{e^{hc/kT\lambda_1} - 1}{e^{hc/kT\lambda_2} - 1} \left(\frac{\lambda_1}{\lambda_2}\right)^5 \frac{d\lambda_2}{d\lambda_1}. \quad (2)$$

If the two wavelength bands are equal (i.e., if the light is filtered by two narrow bandpass filters of equal bandwidth $d\lambda = d\lambda_1 = d\lambda_2$), and the two wavelengths are fixed, the Intensity Ratio becomes:

$$\text{Intensity Ratio} \approx \left(\frac{\lambda_1}{\lambda_2}\right)^5 e^{hc/kT(\lambda_2 - \lambda_1/\lambda_1\lambda_2)} = C_1 e^{C_2/T}, \quad (3)$$

where $C_1$ and $C_2$ are constants. For the case $\lambda_2 > \lambda_1$, $C_2$ is a positive constant, implying that the Intensity Ratio is a monotonically decreasing function of temperature, i.e., a lower Intensity Ratio indicates a higher relative temperature. Thus, the Intensity Ratio is a function of the temperature of the radiating body, which in this case is the temperature of the cut zone.

Advantages of this processing technique become evident when considering the circumstances under which overcombustion or non-penetrating cutting conditions occur during material processing. In both these cases, the radiant light intensity signals ($S_{\lambda,1}$ and $S_{\lambda,2}$) rise in magnitude above their values calculated during clean cutting conditions; however, their ratio increases for the overcombustion cutting condition and the ratio decreases for the non-penetrating cutting condition. For the non-penetrating cutting condition, the radiant light intensity emitted by the workpiece increases as the temperature of the workpiece increases, thereby leading to an increase in the radiant light intensity signals ($S_{\lambda,1}$ and $S_{\lambda,2}$) and a decrease in the Intensity Ratio according to Eqn. (3). For the overcombustion cutting condition, the temperature of the workpiece drops and the Intensity Ratio increases. In addition, the overcombustion cutting condition generally results in a wider kerf. Due to the wider kerf "visible" to the receiver, the magnitude of the light level incident upon the detectors is large, which causes both of the radiant light intensity signals ($S_{\lambda,1}$ and $S_{\lambda,2}$) to increase. If a single wavelength detection scheme was used, the light source monitor would be unable to distinguish an overcombustion cutting condition from a non-penetrating cutting condition. Further, employing the two wavelength ($S_{\lambda,1}$ and $S_{\lambda,2}$) processing technique for determining cutting quality and assuming a specific material composition and thickness (e.g., 12.7 mm steel), the optimal range for the Intensity Ratio is, generally, independent of average laser power and the exit diameter of the nozzle. This is an advantage in that the light source monitor 332 could be used in different material processing system installations without requiring an operator to determine custom operating parameters.

Figure 6:
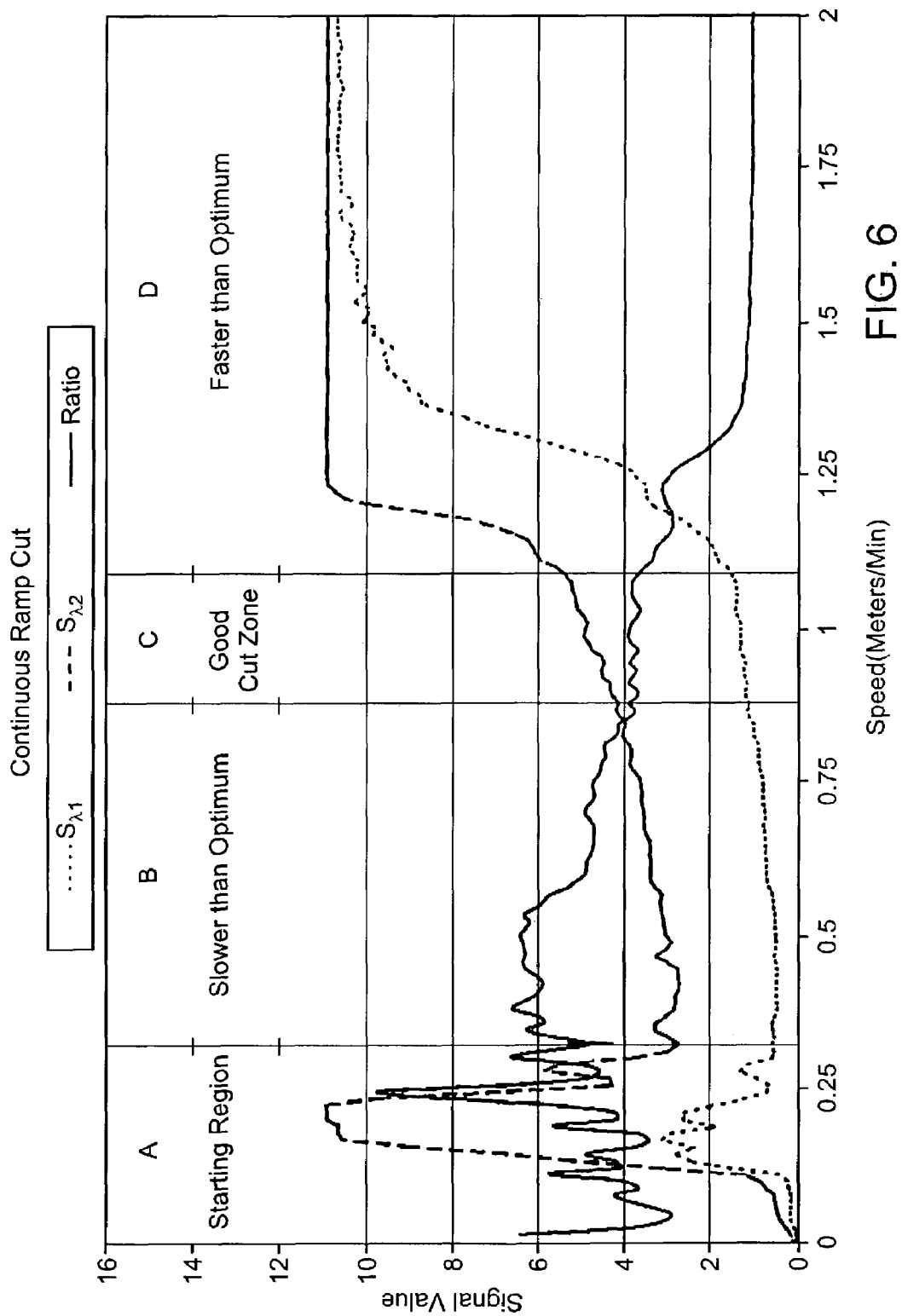
FIG. 6 is a graph of data representative of an embodiment of a material processing system of the present invention.

The exclusive use of the Intensity Ratio to control cut speed, however, can also lead to ambiguous results. FIG. 6 shows a plot of the radiant light intensity signals ($S_{\lambda,1}$ or $S_{\lambda,2}$), as well as the intensity ratio vs. cut speed for a test cut, where the cut speed is varied from 0 to 2 meters/minute. FIG. 6 shows four cut conditions that occur as the test cut speed changes from 0 to 2 meters/minute. The first region "A" is the starting region, which ranges from 0 to about 0.33 meters/minute. In the starting region the kerf front is almost vertical and emissions are small. The second region "B" is a region where cut speed is slower than optimal. In this embodiment, region B extends from about 0.33 to 0.9 meters/minute. Region B is categorized in that both ($S_{\lambda,1}$ or $S_{\lambda,2}$ are increasing, while the intensity ratio is decreasing because $S_{\lambda,2}$ is increasing faster than $S_{\lambda,1}$. The third region "C" is categorized as a good cut zone region because the cut speed is generally optimal. In this embodiment, the C region extends from about 0.9 to 1.1 meters/minute. The fourth region "D" is a region where the cut speed is faster than optimal and results in a non-penetrating cut. In this embodiment, region D is any cutting speed greater than about 1.1 meters/minute. Region D is categorized in that the intensity ratio is decreasing from the intensity levels in the generally optimized cut zone C, and the absolute values of $S_{\lambda,1}$ and $S_{\lambda,2}$ are increasing. The Intensity Ratio can have the same value on either side of region C at two very different cut speeds, for example, one peak at a low speed and the other at a higher speed. A material processing system in which quality is based on the Intensity Ratio solely would be unable to distinguish between these two different conditions.

The light source monitor 332 addresses this problem by using a magnitude of at least one of the radiant light intensity signals ($S_{\lambda,1}$ or $S_{\lambda,2}$) along with the Intensity Ratio to determine the cutting quality. For an overcombustion cutting condition, the radiant light intensity signals ($S_{\lambda,1}$ or $S_{\lambda,2}$) both increase in magnitude. Thus, by specifying a threshold for either wavelength ($S_{\lambda,1}$ or $S_{\lambda,2}$) signal, an overcombustion cutting condition can be detected. The condition associated with an overcombustion cut can be detected when the Intensity Ratio is greater than a predetermined upper limit and one of the wavelength ($S_{\lambda,1}$ or $S_{\lambda,2}$) signal exceeds a second predetermined limit. In one embodiment, the magnitude can be a maximum. In another embodiment, the magnitude can be a minimum. In another embodiment, the magnitude can be between the minimum and maximum.

For a non-penetrating cutting condition, the radiant light intensity signals ($S_{\lambda,1}$ or $S_{\lambda,2}$) both increase in magnitude. Thus, by specifying a threshold for either wavelength ($S_{\lambda,1}$ or $S_{\lambda,2}$) signal, in conjunction with a threshold in the Intensity Ratio a non-penetrating cutting condition can be detected. The condition associated with a non-penetrating cut can be detected when the Intensity Ratio is less than a predetermined lower limit and either wavelength ($S_{\lambda,1}$ or $S_{\lambda,2}$) signal increases above a second predetermined limit. In one embodiment, the magnitude can be a maximum. In another embodiment, the magnitude can be a minimum. In another embodiment, the magnitude can be between the minimum and maximum.

Similarly, for very low and very high cutting speeds, the Intensity Ratio calculated for these conditions could be similar, thus masking the character (e.g., whether the cut is penetrating or non-penetrating) of the cut quality. At low cutting speeds, both radiant light intensity signals ($S_{\lambda,1}$ or $S_{\lambda,2}$) are small in value. For high speeds (e.g., above the optimum cutting speed range), both the radiant light intensity signals ($S_{\lambda,1}$ or $S_{\lambda,2}$) increase in value as the laser fails to penetrate the workpiece and instead heats up the workpiece.

It should be noted that intensity ratio vs. cutting speed charts, like the one shown in FIG. 6, should be generated for different workpiece materials and thickness, as well as for different laser systems. The will allow the user to determine the generally optimal cutting range for a given material, with a given thickness, for a given laser system.

Figure 4A:
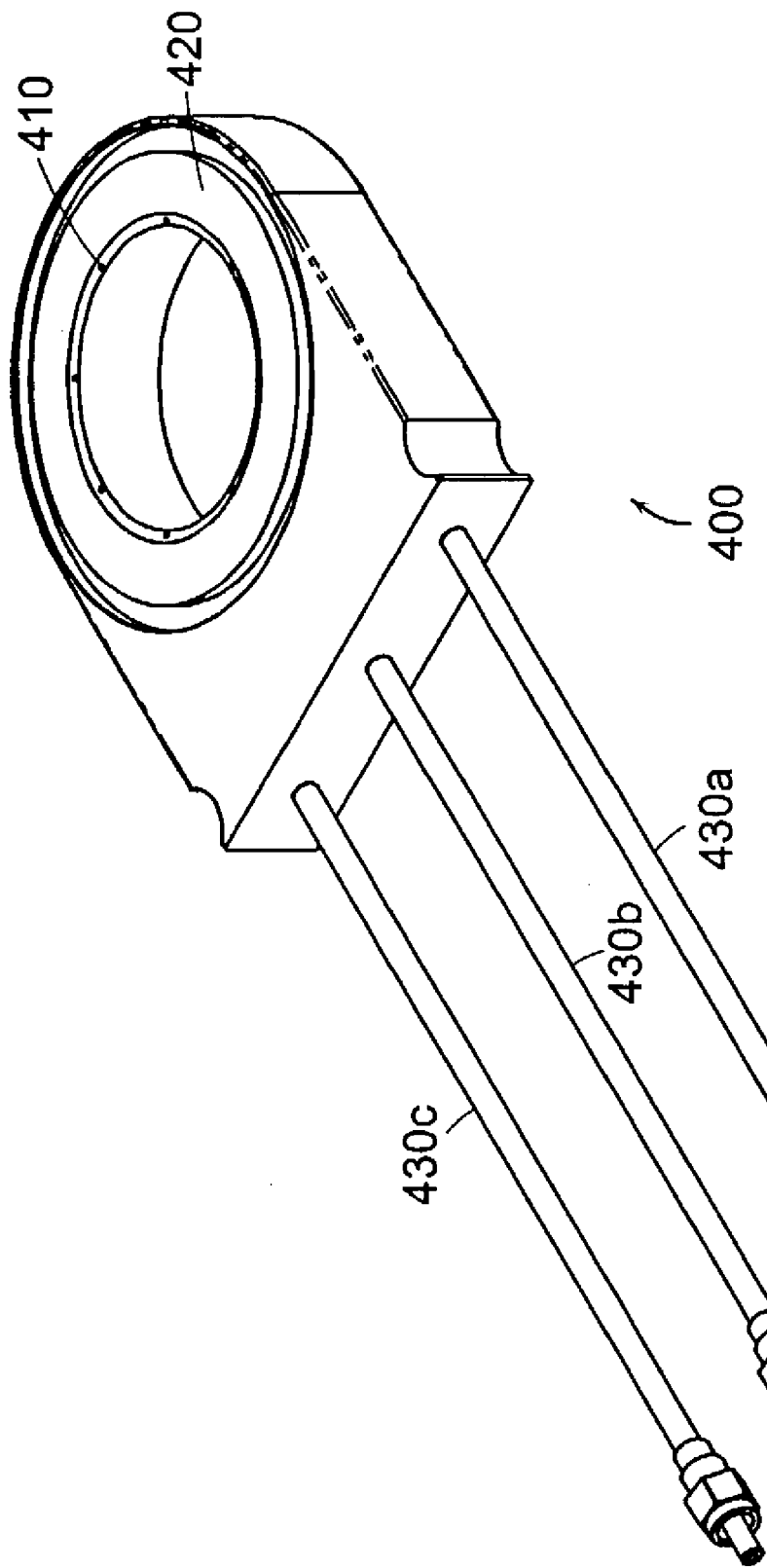
FIG. 4A is a perspective view of an optical receiver of a material processing apparatus for monitoring the light emitted by a workpiece in accordance with an embodiment of the present invention.

In another embodiment, illustrated in FIG. 4A, an optical receiver 400, having an annular shape is provided for monitoring at least one optical signal emitted from the cut zone of a processed workpiece. In this one embodiment, the receiver 400 comprises eight ports 410 that are located equally spaced around the circumference of a ring 420 of the receiver 400. The optical signal that passes through each port 410 is subsequently passed via individual optical fibers (not shown) to each of three fiber optic cables 430a, 430b, and 430c (generally 430). The portion of the optical signal passed through each port 410 is divided equally among each cable 430.

In this embodiment, the receiver 400 is located within a laser cutting head 104, as shown in FIGS. 4B and 4C. The cables 430 (only one cable 430 is shown for purposes of clarity) are each connected to an individual optical detector 320. The optical signals 324 are passed to each optical detector 320 by each respective cable 430. The detectors 320 measure the radiant light intensity of the optical signals 324 emitted from the workpiece 112 in response to the energy beam 110. The output (i.e., the radiant light intensity in a discrete, narrow spectral band) of each detector 320 is then passed to a light source monitor, such as the light source monitor 332 of FIG. 3. In one embodiment, the light source monitor provides an operator with an indication of the quality of the cut produced by the material processing apparatus. In another embodiment, the light source monitor may be an input to a real time monitoring system, such as the system described in co-pending patent application entitled "Centralized Control Architecture for a Laser Cutting System" (Serial No. not yet available) filed on Mar. 31, 2003, the disclosure of which is hereby incorporated by reference in its entirety.

Alternative spacing and numbers (e.g., 3 or greater) of ports 410 and respective optical fibers may be used in other embodiments. However, it is generally desirable to use a sufficient number (e.g., greater than three) of ports 410 to ensure that the receiver 400 measures the average light emitted by the workpiece undergoing material processing. When a sufficient number of ports (e.g., greater than three) are used, the determination of cut quality is insensitive, or less sensitive, to the cutting direction.

Figure 5:
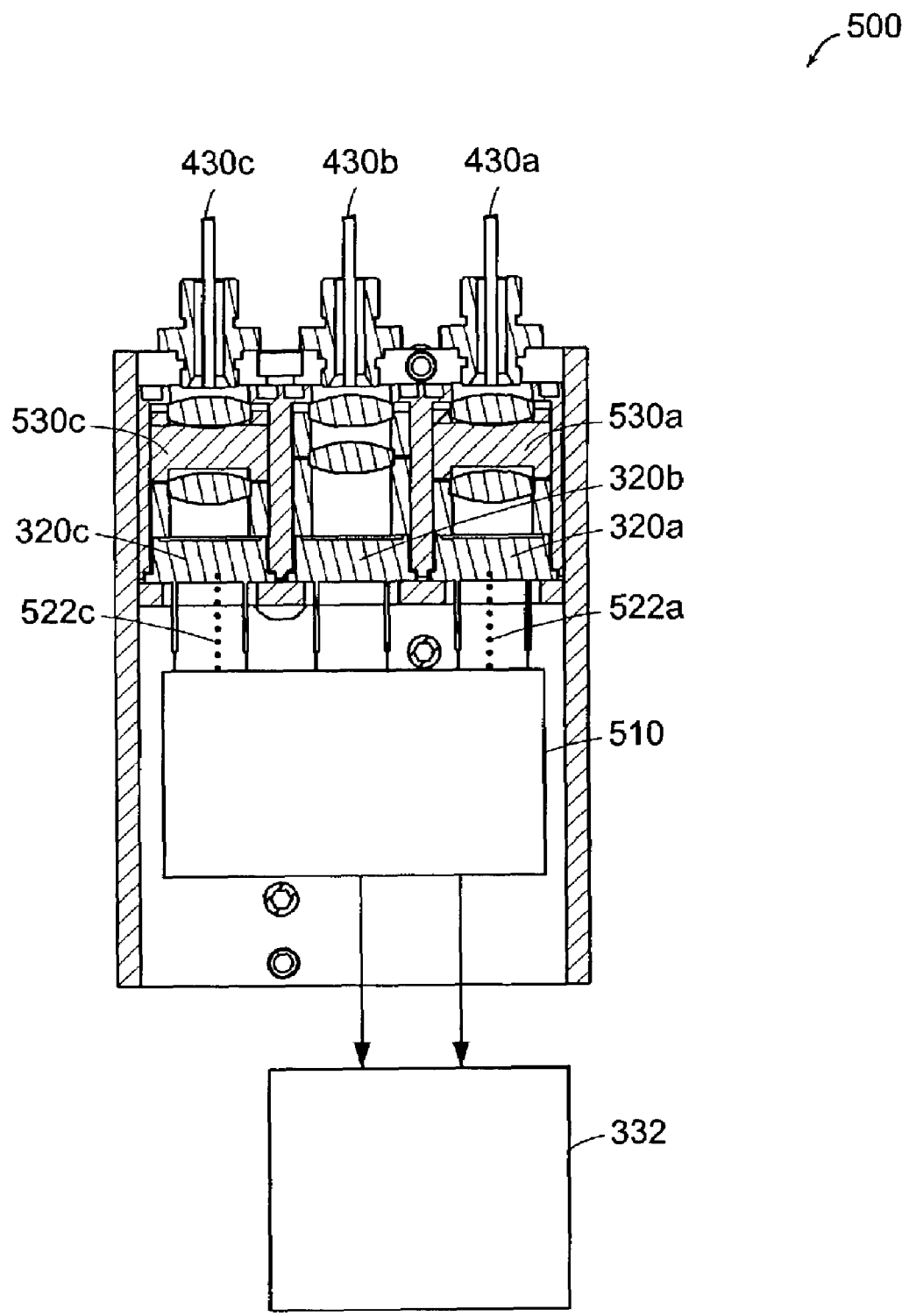
FIG. 5 is an illustration of a detector system for monitoring quality of the processing performed by a material processing apparatus in accordance with an embodiment of the present invention.

In another embodiment, illustrated in FIG. 5, the cables 430a, 430b, and 430c transmit the optical signals to a detector system 500. The optical signals passing through the cables 430a and 430c are subsequently passed through two signal filters 530a and 530c, respectively. The filters 530a and 530c condition the optical signals passed through the filters so they each represent a narrow spectral band of radiant light intensity as described previously herein. By way of example, the filters 530a and 530c are filter model nos. F10-1050.0-4-0.50 and F10-560.0-4-0.50, sold by CVI Laser Corp, located in Putnam, Conn. The radiant light intensity signals ($S_{\lambda 1}$) passed by filter 530a represents a narrow band of light at a wavelength of light centered at about 560 nm, but generally between about 450 nm and about 650 nm. The radiant light intensity signals ($S_{\lambda 2}$) passed by filter 530c represents a narrow band of light at a wavelength of light centered at about 1,050 nm, but generally between about 950 nm and about 1,150 nm.

The radiant light intensity signals ($S_{\lambda 1}$ or $S_{\lambda 2}$) output by the filters 530a and 530c pass to detectors 320a and 320c, respectively. Detectors 320a and 320c convert the radiant light intensity signals ($S_{\lambda 1}$ or $S_{\lambda 2}$) into electrical signals or outputs 522a and 522c, respectively. The outputs 522a and 522c are subsequently passed to a signal conditioning module 510. The signal conditioning module 510, e.g., amplifies the outputs 522a and 522c and passes the amplified signals to the light source monitor 332. The light source monitor 332 determines the processing quality of a workpiece based upon the outputs 522a and 522c. The light source monitor 322 calculates a ratio (i.e., the Intensity Ratio of Eqn. 3) of the output 522a relative to the output 522c. Typically, the ratio is calculated in real-time or at discrete predetermined points in time to create an indication of processing quality as a function of time. The light source monitor 332 also extracts a magnitude, for example, the magnitude of the outputs 522a or 522c at the same predetermined points in time as the ratio is calculated. In one embodiment, the magnitude can be a maximum. In another embodiment, the magnitude can be a minimum. In another embodiment, the magnitude can be between the minimum and maximum.

The light source monitor 332 then compares the ratio and the magnitude with a lookup table stored within the light source monitor 332 to determine the quality of the material processing being performed at the predetermined points in time. In one embodiment, the lookup table is a collection of experimental data that is predetermined by the manufacturer of the system or by an operator of the system. The table can include data for different workpiece materials (e.g., steel, aluminum, and titanium), different material thickness, different cutting rates, different cutting accelerations, and different cutting profiles (e.g., curves or straight lines). An example of data for a straight line cut of mild steel that could be included in a lookup table is provided below:

| Material Thickness | Target Ratio | Max Magnitude S1 |
|---|---|---|
| ¼" | 2.8 | 4 |
| ½ | 4 | 3 |
| ¾ | 5 | 2.5 |

By way of example, the measure of the quality of the material processing being performed at a specific point in time can be a value that indicates, e.g., whether the material processing system is operating in a condition that results in overcombustion cutting conditions, clean (normal) cutting conditions or non-penetrating cutting conditions of the workpiece.

FIG. 6 illustrates an example of data acquired by an embodiment of a material processing apparatus used to cut a 12.7 mm thick steel workpiece using a laser system. The graph depicts two filtered signals 530a and 530c as $S_{\lambda 2}$ and $S_{\lambda 1}$. FIG. 6 also shows a ratio of the $S_{\lambda 1}$ and $S_{\lambda 2}$n signals. The $S_{\lambda 2}$" data represents the filtered radiant light intensity (measured by a detector in a narrow spectral band that has a center wavelength equivalent to the wavelength of light, which in one embodiment can be a wavelength of about 675 nm. The $S_{\lambda 1}$ data represents the radiant light intensity (measured by a detector in a narrow spectral band that has a center wavelength equivalent to the wavelength of light, which in one embodiment can be a wavelength of about 560 nm. In other embodiments, the optical signal can be filtered between a range of about 450 nm and about 1050 nm. The ratio data represents the ratio of the $S_{\lambda 2}$ data and the $S_{\lambda 1}$ data (i.e., a representation of the Intensity Ratio as described herein).

It should be noted that any pair of spectral bands can be used based upon the material to be processed, the thickness of the material, and the equipment to be used. Typically, the spectral band can be any range between about 300–2000 nm.

The X-axis of the graph represents the speed of the cutting process, where cut speed increases from 0 to 2 meters per minute. Also indicated in the graph is region C, the good cut zone (e.g., minimal dross or desirable kerf size). The graph also illustrates a slower than optimal condition, region B, at a cut speed ranging from about 0.33 to 0.9 meters/minute. Region D is a faster than optimal cutting condition, where the cut speed is greater than about 1.1 meters/minute. Finally, the graph also illustrates a starting region, region A, which ranges from 0 to about 0.33 meters/minute.

By varying the speed of the cut, this allows for experimental determination of a good cutting region, an overcombustion region, and a non-penetration cutting region. In addition to a predetermined lookup table, the conditions can be determined automatically by a test cut as described n FIG. 6 and an algorithm can be used to identify the optimal region for cutting.

Variations, modifications, and other implementations of what is described herein will occur to those of ordinary skill in the art without departing from the spirit and the scope of the invention claimed. Accordingly, the invention is to be defined not by the preceding illustrative description but instead by the spirit and scope of the following claims.

What is claimed is:

1. A method for monitoring the processing of a workpiece, the method comprising the steps of:
   directing an incident laser beam onto a workpiece;
   measuring at least one signal emitted from said workpiece in response to the incident laser beam at an optical detector, said detector generating two outputs based on said at least one signal; and
   determining whether a condition of the processing of the workpiece is an overcombustion cutting condition or a non-penetrating cutting condition based on a ratio of said two outputs and a magnitude of at least one of said two outputs.

2. The method of claim 1 wherein said detector comprises a sandwich detector.

3. The method of claim 1 wherein said detector comprises two elements.

4. The method of claim 1 comprising the steps of:
   determining a location in a lookup table based on said ratio and said magnitude of at least one of said two outputs; and
   extracting a value from said lookup table based upon said location in said lookup table.

5. The method of claim 1 comprising obtaining a test cut to determine said ratio of further said two outputs and said magnitude of at least one of said two outputs indicative of a good cut.

6. The method of claim 1 wherein said magnitude of the at least one of said two outputs is a maximum value.

7. The method of claim 1 wherein said detector comprises at least two detector elements.

8. The method of claim 1 wherein said two outputs comprise a first spectral band of light and a second spectral band of light.

9. The method of claim 8 wherein said first spectral band of light has a lower band of wavelengths than the second spectral band of light.

10. The method of claim 8 wherein said first spectral band of light is a spectral band between about 450 nm and about 650 nm.

11. The method of claim 8 wherein said second spectral band of light is a spectral band between about 950 nm and about 1150 nm.

12. The method of claim 1 wherein said laser beam is directed onto a workpiece by a cutting head, said cutting head comprises a plenum, a nozzle, a focusing lens, and an optical receiver, and the detector.

13. The method of claim 12 wherein said optical receiver comprises at least one port for conveying said at least one signal to a cable, said cable conveying said at least one signal to said detector.

14. The method of claim 1 wherein the overcombustion cutting condition includes a slower than optimal cutting condition.

15. The method of claim 1 wherein the non-penetrating cutting condition includes a faster than optimal cutting condition.

16. The method of claim 1 wherein the step of determining whether a condition of the processing of the workpiece is an overcombustion cutting condition comprises:
   determining a value based on one or both of the magnitudes of the two outputs;
   determining whether the value is greater than a predetermined magnitude value; and
   determining whether the ratio is greater than or less than a predetermined ratio value.

17. The method of claim 16 further comprising determining whether the ratio is greater than the predetermined ratio value, wherein a denominator of the ratio corresponds to a first spectral band of light and a numerator of the ratio corresponds to a second spectral band of light, the first spectral band of light having a lower band of wavelengths than the second spectral band of light.

18. The method of claim 1 wherein the step of determining whether a condition of the processing of the workpiece is a non-penetrating cutting condition comprises:
   determining a value based on one or both of the magnitudes of the two outputs;
   determining whether the value is greater than a predetermined magnitude value; and
   determining whether the ratio is greater than or less than a predetermined ratio value.

19. The method of claim 18 further comprising determining whether the ratio is less than the predetermined ratio value, wherein a denominator of the ratio corresponds to a first spectral band of light and a numerator of the ratio corresponds to a second spectral band of light, the first spectral band of light having a lower band of wavelengths than the second spectral band of light.

20. The method of claim 16 wherein the value determined based on one or both of the magnitudes of the two outputs is the maximum of the two.

21. The method of claim 16 wherein the value determined based on one or both of the magnitudes of the two outputs is the minimum of the two.

22. The method of claim 16 wherein the value determined based on one or both of the magnitudes of the two outputs is a value between the two magnitudes.

23. The method of claim 18 wherein the value determined based on one or both of the magnitudes of the two outputs is the maximum of the two.

24. The method of claim 18 wherein the value determined based on one or both of the magnitudes of the two outputs is the minimum of the two.

25. The method of claim 18 wherein the value determined based on one or both of the magnitudes of the two outputs is a value between the two magnitudes.

26. The method of claim 8 wherein the first spectral band of light and the second spectral band of light are spectral bands between about 300 nm and about 2000 nm.

* * * * *

UNITED STATES PATENT AND TRADEMARK OFFICE
CERTIFICATE OF CORRECTION

PATENT NO. : 7,186,947 B2 Page 1 of 1
APPLICATION NO. : 10/403775
DATED : March 6, 2007
INVENTOR(S) : Connally et al.

It is certified that error appears in the above-identified patent and that said Letters Patent is hereby corrected as shown below:

In claim 4, column 9, line 37, please insert --further-- before "comprising"

In claim 5, column 9, line 43, please insert --further-- before "comprising"

Signed and Sealed this

Twenty-second Day of May, 2007

JON W. DUDAS
*Director of the United States Patent and Trademark Office*